US008375362B1

(12) United States Patent
Brette et al.

(10) Patent No.: US 8,375,362 B1
(45) Date of Patent: Feb. 12, 2013

(54) WIZARD FOR WEB SERVICE SEARCH ADAPTER

(75) Inventors: Marc Brette, Domene (FR); Frederic Lombardo, Saint-Pierre d'Allevard (FR)

(73) Assignee: EMC Corporation, Hopkinton, MA (US)

( * ) Notice: Subject to any disclaimer, the term of this patent is extended or adjusted under 35 U.S.C. 154(b) by 1215 days.

(21) Appl. No.: 11/605,844

(22) Filed: Nov. 28, 2006

(51) Int. Cl.
G06F 9/44 (2006.01)
G06F 9/45 (2006.01)

(52) U.S. Cl. .......................... 717/121; 717/136; 717/174

(58) Field of Classification Search ........................ None
See application file for complete search history.

(56) References Cited

U.S. PATENT DOCUMENTS

| | | | |
|---|---|---|---|
| 6,775,680 B2 * | 8/2004 | Ehrman et al. | 717/136 |
| 7,092,938 B2 * | 8/2006 | Brown et al. | 707/709 |
| 7,149,978 B1 * | 12/2006 | Maffezzoni | 717/174 |
| 7,222,334 B2 * | 5/2007 | Casati et al. | 717/121 |
| 7,316,022 B2 * | 1/2008 | Nishio | 717/174 |
| 7,380,237 B2 * | 5/2008 | Goring et al. | 717/121 |
| 7,451,432 B2 * | 11/2008 | Shukla et al. | 717/121 |
| 7,493,592 B2 * | 2/2009 | Karatal et al. | 717/121 |
| 7,533,181 B2 * | 5/2009 | Dawson et al. | 717/174 |
| 7,533,379 B2 * | 5/2009 | Garms et al. | 717/176 |
| 7,567,953 B2 * | 7/2009 | Kadayam et al. | 1/1 |
| 7,574,712 B2 * | 8/2009 | Allamaraju et al. | 719/318 |
| 7,774,195 B2 * | 8/2010 | Kohlmeier et al. | 717/136 |
| 7,783,637 B2 * | 8/2010 | Bitsch et al. | 717/136 |
| 7,783,717 B1 * | 8/2010 | Savchenko et al. | 709/217 |
| 7,822,826 B1 * | 10/2010 | Savchenko et al. | 709/217 |
| 7,890,948 B2 * | 2/2011 | Bergman et al. | 717/174 |
| 7,962,464 B1 * | 6/2011 | Brette et al. | 707/706 |
| 8,228,825 B2 * | 7/2012 | Yin et al. | 717/174 |
| 8,266,224 B2 * | 9/2012 | Ramarao et al. | 717/136 |
| 2002/0143524 A1 * | 10/2002 | O'Neil et al. | 704/9 |
| 2005/0080768 A1 * | 4/2005 | Zhang et al. | 707/3 |
| 2005/0120016 A1 * | 6/2005 | Midgley | 707/5 |
| 2005/0132381 A1 * | 6/2005 | Fiammante et al. | 719/310 |
| 2005/0166188 A1 * | 7/2005 | Secrist et al. | 717/136 |
| 2005/0177562 A1 * | 8/2005 | Raciborski | 707/3 |
| 2006/0085412 A1 * | 4/2006 | Johnson et al. | 707/4 |
| 2006/0155817 A1 * | 7/2006 | Desai et al. | 709/208 |
| 2007/0044066 A1 * | 2/2007 | Meijer et al. | 717/100 |
| 2008/0082962 A1 * | 4/2008 | Falk et al. | 717/113 |
| 2008/0313615 A1 * | 12/2008 | Cai et al. | 717/121 |

OTHER PUBLICATIONS

Graupmann, et al., "Towards Federated Search Based on Web Services", 2003, published online. [retrieved on Jun. 14, 2011]; Retrieved from Internet <URL:http://www.mpi-inf.mpg.de/departments/d5/publications/graupmann-btw2003.pdf>; pp. 1-10.*

Dignum, et al., "Organizing Web Services to develop Dynamic, Flexible, Distributed Systems", 2009, ACM; [retrieved on Nov. 13, 2012]; Retrieved from Internet <URL: http://dl.acm.org/citation.cfm?id=1806338>;pp. 225-234.*

(Continued)

*Primary Examiner* — Thuy Dao
*Assistant Examiner* — Xi D Chen
(74) *Attorney, Agent, or Firm* — Van Pelt, Yi & James LLP (57) ABSTRACT

Generating a search web services adapter is disclosed. An indication is received that an input parameter associated with an operation associated with the web service corresponds to a search query parameter. An indication is received that an output parameter associated with the operation corresponds to a search result parameter. Adapter code is automatically generated that is configured to translate a query into a form required by the web service to perform the operation, including by mapping a received input value for the search query parameter to the input parameter, and to translate a result of the operation, including by mapping a received output value for the output parameter to the search result parameter.

24 Claims, 13 Drawing Sheets

OTHER PUBLICATIONS

Nezhad, et al., "Semi-Automated Adaptation of Service Interactions", 2007, ACM; [retrieved on Nov. 13, 2012]; Retrieved from Internet <URL: http://dl.acm.org/citation.cfm?id=1242572>;pp. 993-1002.*

Kumar, et al., "Towards a Unified View of Service-Oriented Web", 2006, IEEE; [retrieved on Nov. 13, 2012]; Retrieved from Internet <URL: http://ieeexplore.ieee.org/stamp/stamp.jsp?tp=&arnumber=4125697>;pp. 862-857.*

McFaddin, et al., "Modeling and Managing Mobile Commerce Spaces using RESTful Data Services", 2006, IEEE; [retrieved on Nov. 13, 2012]; Retrieved from Internet <URL: http://ieeexplore.ieee.org/stamp/stamp.jsp?tp=&arnumber=4511438>;pp. 81-89.*

* cited by examiner

Operation Information 610

WSDL Name: WebSiteServices.wsdl 612
Operation Name: AuthorSearchRequest

○ Login Operation
● Search Operation — 614
○ Access Operation

[See Generated Code]

Operation Input Parameter Information

Element Type: Simple Attribute
Name: author 616
Type: String
Association Type: Direct ▼

Map To ECI Parameter....

Themes: Core ▼

Theme Attributes: 622

| URL | Author |
| Abstract | 618 |
| Author | |
| Body | >> |
| Date | 620 |
| Full-text | |
| Keywords | |
| Rank | |
| Size | [Remove] |
| Title | |

[< Back] [Next >] [Finish] [Cancel]

FIG. 6B

Operation Information 630

WSDL Name: WebSiteServices.wsdl
632
Operation Name: AuthorSearchRequest

[ See Generated Code ]

Operation Output Parameter Information

Element Type: Simple Attribute
Name: publisher 636
Type: String
Association Type: Direct ▼

Map To ECI Parameter....

Themes: Library ▼
642
Theme Attributes:

| Location        |     | Publisher |
|-----------------|-----|-----------|
| Abstract        | 638 |           |
| Publisher       |     |           |
| ISBN_Number     | >>  |           |
| Publication_Name| 640 |           |
| Publication_Year|     |           |
| ●               |     |           |
| ●               |     |           |
| ●               |     | [Remove]  |

[ < Back ] [ Next > ] [ Finish ] [ Cancel ]

FIG. 6C

Define Your Query Translator

650

| | | |
|---|---|---|
| AND | and | (AND, and, +, null if not available) |
| OR | or | (OR, or, null if not available) |
| ANDNOT | andnot | (ANDNOT, andnot, -, null) |
| WildCard | null | (*, ?, null if not available) |
| NEAR | null | (NEAR, near, null if not available) |
| WITHIN | null | (WITHIN, within, null) |
| Distance | false ▼ | (Support distance with proximity operator) |
| Phrases | false ▼ | (Support "" phrases for exact matches) |
| Parenthesis | false ▼ | (Support nested expressions) |
| Fields | true ▼ | (Support field search) |
| Boolean | true ▼ | (Support boolean search) |

652

[ < Back ] [ Next > ] [ Finish ] [ Cancel ]

FIG. 6D

Operation Information

WSDL Name: WebSiteServices.wsdl

Operation Name: AuthorSearchRequest

- ● Login Operation
- ○ Search Operation
- ○ Access Operation

[See Generated Code]

Login Input Parameter Selection

- ● Login Name
- ○ Password

Map To ECI Parameter....

Theme Attributes:

| UserName |
| Password |

>>

| UserName |

[Remove]

[< Back] [Next >] [Finish] [Cancel]

WIZARD FOR WEB SERVICE SEARCH ADAPTER

BACKGROUND OF THE INVENTION

The web services paradigm and implementing protocols facilitate machine to machine communication. Some web services make stored content available, and it may be desirable to include such web services as a source of information responsive to a search query. However, each web service has its own interface with the result that an adapter capable of using a specific web service generally would be required to include a web service as a source of content that is searched in response to a query. It would be useful to be able to use web services as an information source for applications and to be able to easily integrate web services into applications.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Generating a search web service adapter is disclosed. An indication is received that an input parameter associated with an operation associated with the web service corresponds to a search query parameter. An indication is received that an output parameter associated with an operation associated with the web service corresponds to a search result parameter. Adapter code is generated which is configured to translate a query into a form required by the web service to perform the operation. The adapter code includes mapping a received input value for the search query parameter to the input parameter, and includes mapping a received output value for the output parameter to the search result parameter. The adapter code also translates a result of the operation. In some embodiments, a wizard is used to generate a web service adapter with a graphical user interface making it easy to create and integrate the adapter. The adapter can thereby easily be configured so that input, output, access, and login parameters of the web service are appropriately mapped to a system's application parameters. In addition, complex search syntax can be supported between the web service and the system's application as well.

The value of such an adapter is in its integration with the search application of the content management system. The adapter provides a unified view to a searching user; the query language is unified as well as the format of the search results. As the source is exposed through an ECI Adapter, it benefits also from query compensation already available to other adapters—for example, the ECI Server may transform the query and do post-filtering to emulate missing capabilities in the source.

Figure 1:
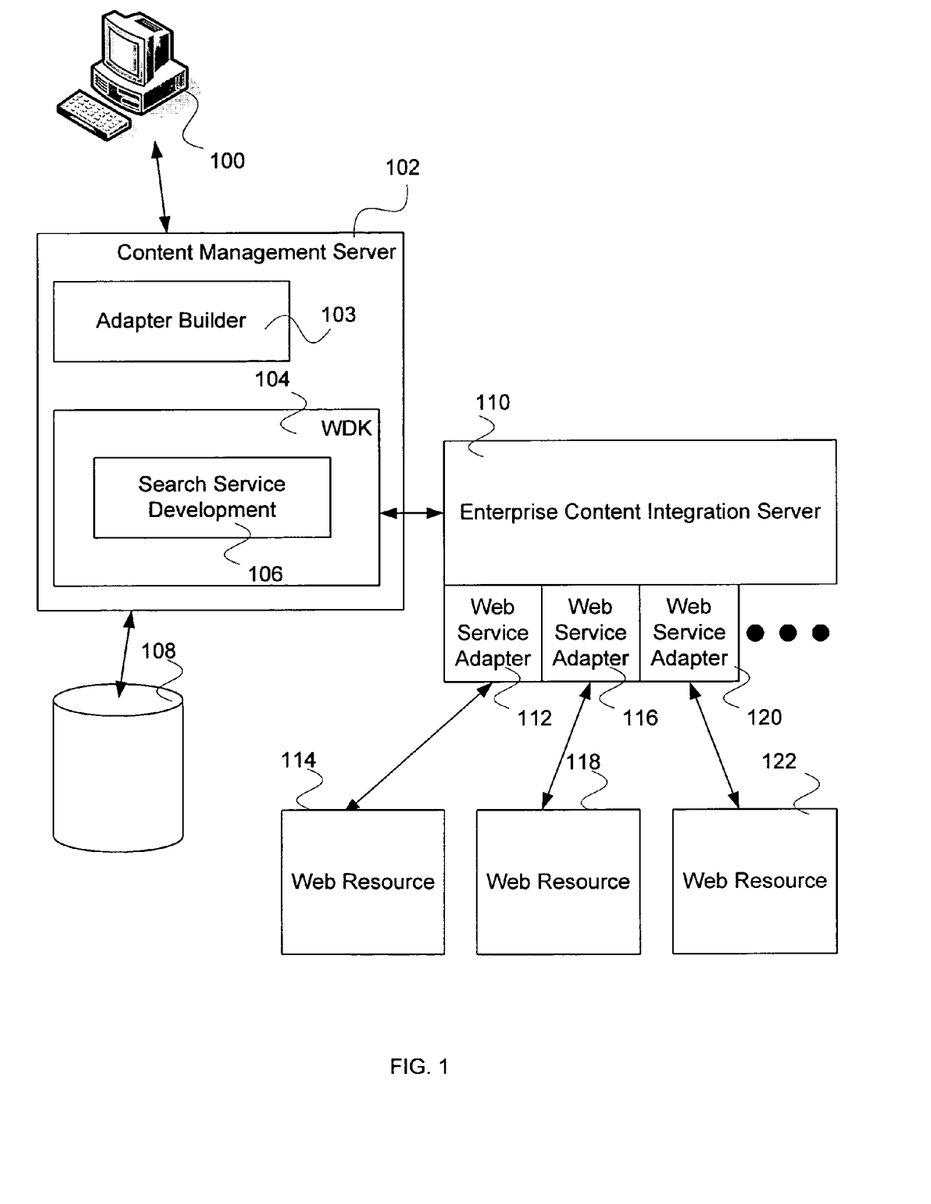
FIG. 1 is a block diagram illustrating an embodiment of a system for a wizard for a web service adapter.

FIG. 1 is a block diagram illustrating an embodiment of a system for a wizard for a web service adapter. In the example shown, one or more users connect to content management server 102 using a computer system, represented in FIG. 1 by computer 100. In the example shown, content management server 102 is built on a content management system vendor-provided web development kit (WDK) 104. In some embodiments, WDK 104 comprises a set of tools to facilitate development of web-based applications, e.g., by providing reusable components pre-configured to interact with a content server and/or other repository to provide content management services. The adapter development environment, adapter builder 103, is an application running in the content management server environment; the adapter builder builds an adapter that is deployed in an external server such as an ECI server; in this case, one of the benefits of the ECI Adapter approach is that the user application (i.e. the application in the content management system) doesn't have to know about the lower level details that are handled by the ECI Server. Content management server 102 includes search service development 106. An adapter can be developed by a developer with the help of a wizard so that a web service can act as an information source for a user search requests. An external search server such as an Enterprise content integration (ECI) server 110 is used to execute search requests for a search of one or more web services, represented in FIG. 1 by 114, 118 and 122. In various embodiments, other resources include web information sources or search services—for example, Amazon, Google™, Yahoo™, MSN™, MySimon™, Pricewatch™, AskJeeves™, or any appropriate web information source. The targeted search request is translated and adapted using a web service adapter, represented in FIG. 1 by configuration adapter 112, 116, and 120. The web service adapter also translates and adapts the responses to the search request and passes the responses to ECI server 110 and finally back to content management server 102.

Figure 2:
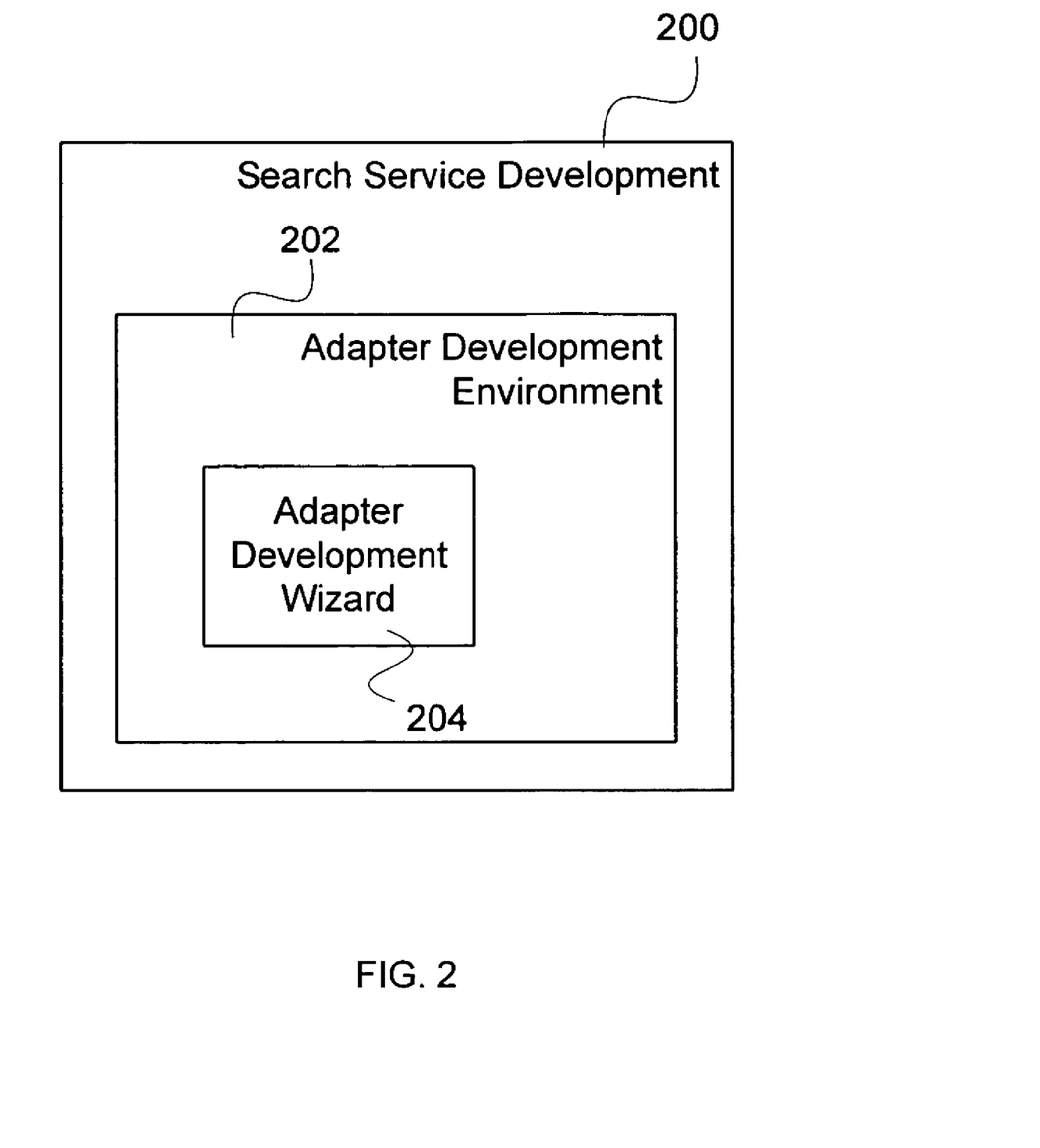
FIG. 2 is a block diagram illustrating an embodiment of search service development.

FIG. 2 is a block diagram illustrating an embodiment of search service development. In some embodiments search service development 200 of FIG. 2 corresponds to search service development 106 in FIG. 1. In the example shown, search service development 200 comprises a set of tools to enable a user to develop search services. Search service development 200 includes adapter development environment 202 for enabling a user to develop an adapter. Adapter development 202 includes adapter development wizard 204 for enabling a user to easily develop an adapter for allowing a user to search a web service and use the web service as an information source for the search. Adapter development wizard 204 enables a user to map input parameter(s) to search query parameter(s) for the web service and to map output parameter(s) to search result parameter(s) from the web service. In some embodiments, mapping input and output parameters to search query or result parameters is achieved using a graphical user interface.

Figure 3:
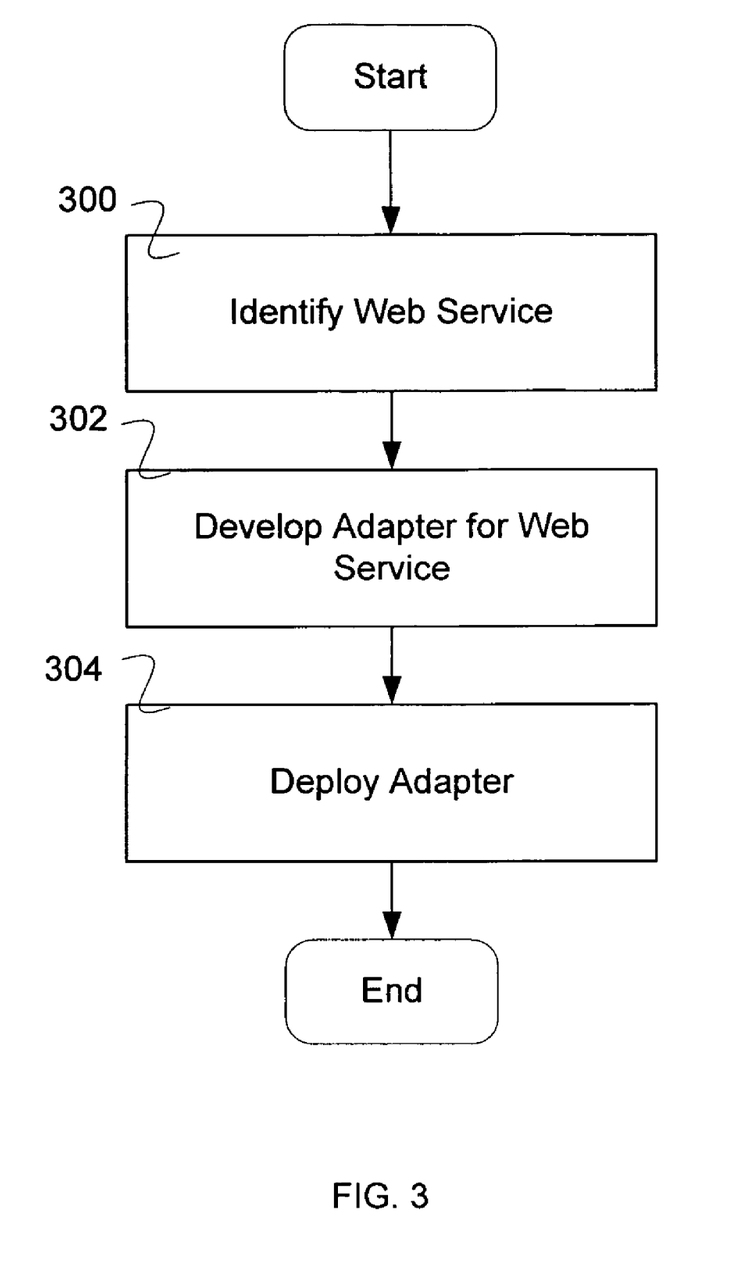
FIG. 3 is a flow diagram illustrating an embodiment of a process for a wizard for a web service adapter.

FIG. 3 is a flow diagram illustrating an embodiment of a process for a wizard for a web service adapter. In some embodiments, the process of FIG. 3 is executed as part of the adapter development wizard 204 of FIG. 2. In the example shown, in 300 a web service is identified. The web service is to be used as an information source. The information source will be used by searching the web service based at least in part on a user search request. In some embodiments, a selection of the web service is received. In 302, an adapter is developed for the web service. Development of the adapter includes selecting an operation on the web site, mapping input and output parameters for the operation, enabling access to the content that is output as a result of the search of performed on the website, and compiling the adapter, testing the adapter code, and allowing modifications of the adapter code. In 304, the adapter is deployed. The adapter is deployed and run on an external search server such as an ECI server.

Figure 4:
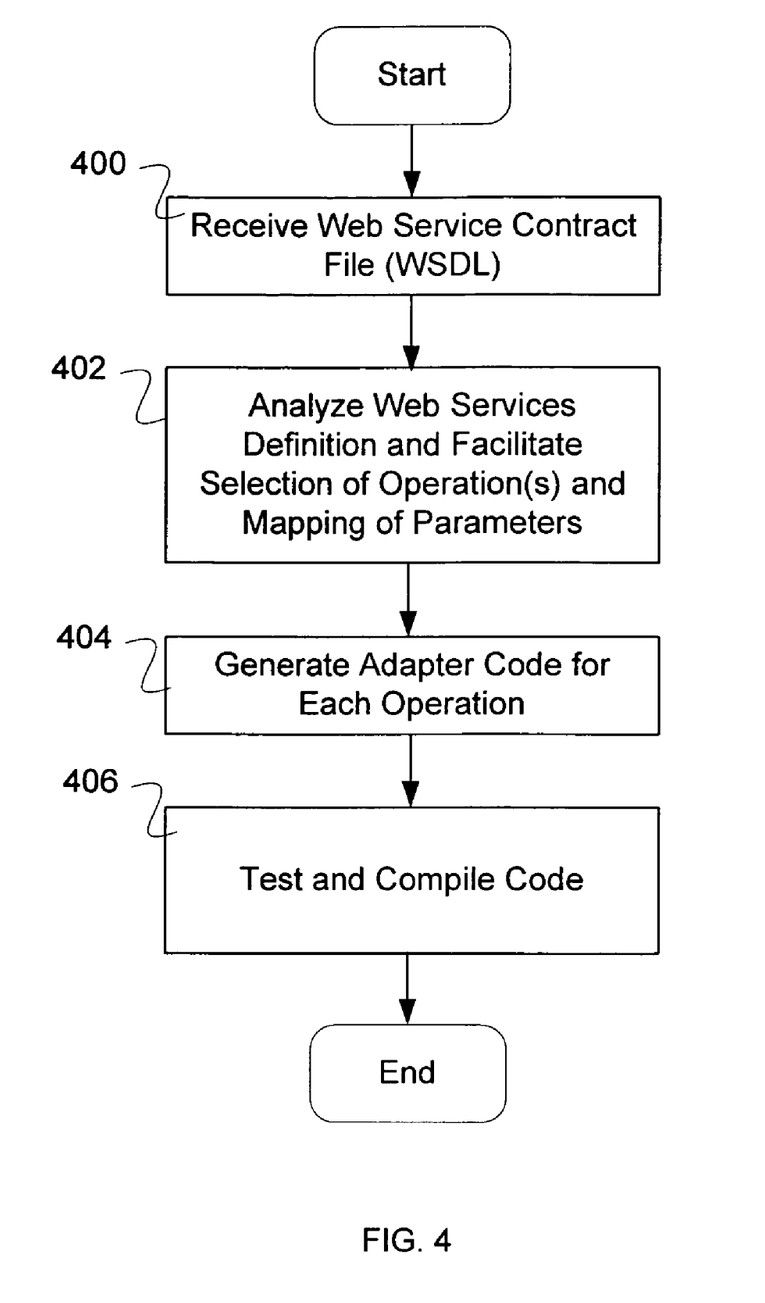
FIG. 4 is a flow diagram illustrating a process for developing a web service adapter.

FIG. 4 is a flow diagram illustrating a process for developing a web service adapter. In some embodiments, the process of FIG. 4 is used to implement 302 of FIG. 3. In the example shown, in 400 the web service contract file is received. In some embodiments, the web service contract file comprises a file in web services description language (WSDL). WSDL is an extensible markup language (XML) based service description on how to communicate using a web service. For example, the protocol bindings and message formats required to interact with the web services. The supported operations and messages are described abstractly, and then bound to a concrete network protocol and message format. In some embodiments, one or more operations available for the web site are identified. In 402, web services definition is analyzed and selection of operation(s) and mapping of parameter(s) is facilitated. The operation at a web service is selected and the interface to the web site is customized including mapping input parameters to web service operation input parameters and output parameters to web service operation output parameters. Also, web service search syntax can be specified to enable complex search queries. In 404, adapter code is generated for each operation. The adapter code is generated to run on a search server automatically. In some embodiments, the code is displayed for a developer running the wizard to develop the web service adapter. In 406, the adapter code is tested and compiled. The code can be modified by the developer either before or after testing.

Figure 5:
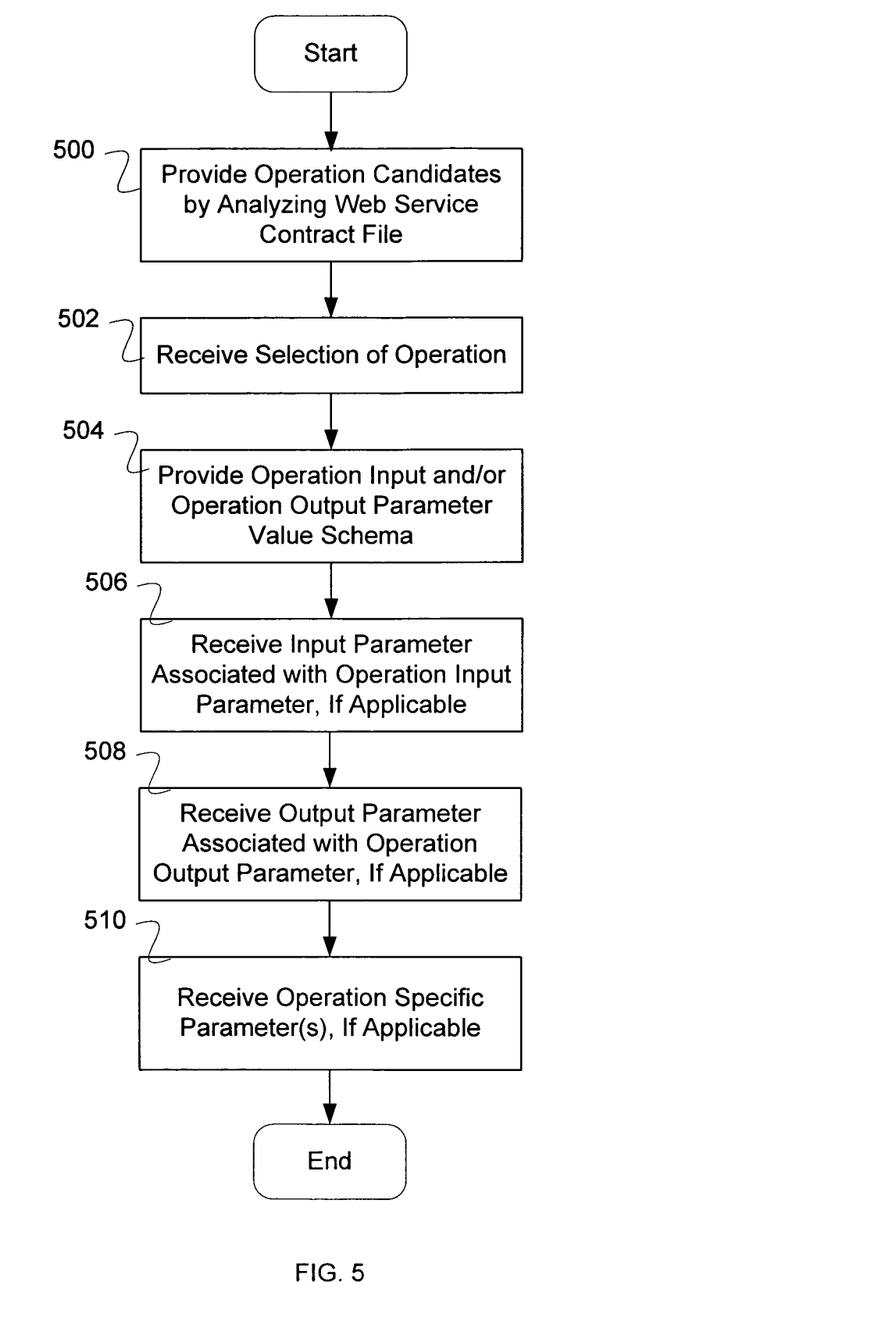
FIG. 5 is a flow diagram illustrating an embodiment of a process for analyzing web services definition and facilitating selection of operation(s) and mapping of parameters.

FIG. 5 is a flow diagram illustrating an embodiment of a process for analyzing web services definition and facilitating selection of operation(s) and mapping of parameters. In some embodiments, the process of FIG. 5 is used to implement 402 of FIG. 4. In the example shown, in 500 operation candidate(s) is/are provided by analyzing a web services contract file. In some embodiments, the operation candidate types include login, search, and access. In 502, a selection of an operation is received. In 504, operation input and/or operation output value schema are provided. In 506, an input parameter is associated with the operation input parameter, if applicable. In some embodiments, a user uses a graphical interface to provide a mapping from an input parameter (e.g., an ECI parameter) to an operation input parameter. For example, for a search operation an input parameter is mapped to a search query input parameter for the web site. The mapping of an operation input parameter may be a list entry selected by highlighting and pressing a button. The mapping may also be a line drawn in a graphical user interface between a parameter in a parameter list and another parameter in another parameter list. In 508, an output parameter is associated with the operation output parameter, if applicable. In some embodiments, a user uses a graphical interface to provide a mapping from an output parameter to an operation output parameter. For example, for a search operation an output parameter is mapped to a search result output parameter for the web site. The mapping of an operation output parameter may be a list entry selected by highlighting and pressing a button. The mapping may also occur by selecting/highlighting a parameter value in a first parameter list and another parameter in another parameter list. In the case of search result output parameters for the web site, multiple search result outputs are supported and mapped. Also, access to the content pointed to in the search result outputs is supported. In 510, an operation specific parameter(s) is/are received, if applicable. In some embodiments, an indication of a search syntax symbol is received to enable searching with complex queries for the selected operation. For example, query string literal may be denoted using quotes (e.g., " "), a variable in a query string may be denoted using a wild card symbol (e.g., * or ?), a logic operation such as AND, OR, or NOT may be denoted using logic symbols (e.g., +, |, or !, respectively). The search syntax symbol can be used when creating complex search query for the web search service.

In some embodiments, a login operation is selected by the user. Login information is received enabling the web adapter to utilize the web service. Login information can include a username and/or a password (or any other kind of credentials). In some embodiments, an access operation is selected by the user. Access includes gaining access to content that is pointed to during the search operation (e.g., content at a uniform resource locator (URL) identified by a search result).

Figure 6A:
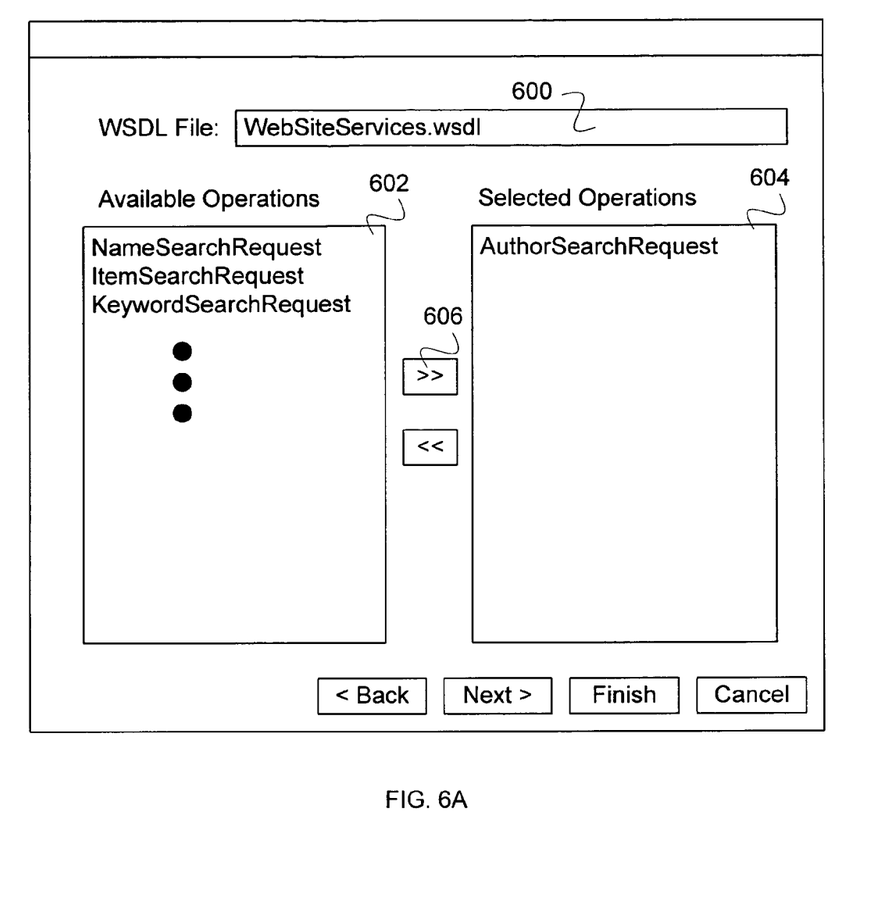
FIG. 6A is a block diagram illustrating an embodiment of a screen that is used for selecting an operation.

FIG. 6A is a block diagram illustrating an embodiment of a screen that is used for selecting an operation. In some embodiments, the screen in FIG. 6A is used for 502 of FIG. 5. In the example shown, the screen shot includes an indication of the WSDL file for the web service in WSDL file window 600, available operations window 602, and selected operations window 604. Available operations window 602 displays a list of available operations as indicated by the WSDL file. The operations can be selected by highlighting and then pushing the ">>" 606 button. The selected operation then appears in selected operations window 604 (e.g., AuthorSearchRequest).

Figure 6B:
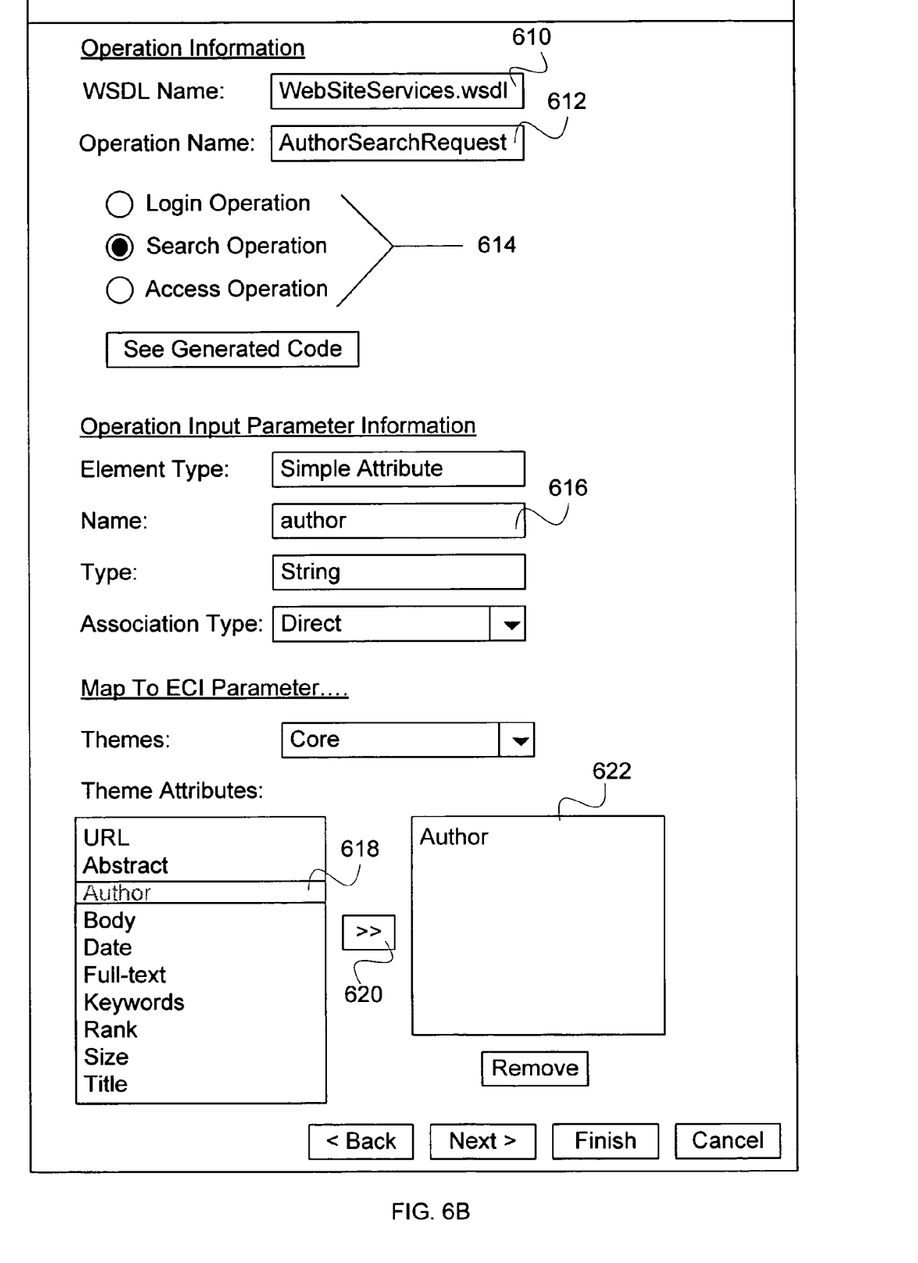
FIG. 6B is a block diagram illustrating an embodiment of a screen that is used for mapping an operation input search parameter to an ECI parameter.

FIG. 6B is a block diagram illustrating an embodiment of a screen that is used for mapping an operation input search parameter to an ECI parameter. In some embodiments, the screen in FIG. 6B is used for 506 of FIG. 5. In the example shown, the screen shot includes an indication of the WSDL file for the web service in WSDL file window 610, operation name window 612, radio buttons 614 to select the type of operation, name of operation input parameter window 616, ECI parameter list window 618, button 620 to move selected ECI parameter, and selected ECI parameter window 622. In some embodiments, input parameter information includes element type, type of parameter (e.g., string), and association type (e.g., direct). In some embodiments, ECI parameters groups, or themes, are selected using a pull down menu, which presents the user with a list of ECI parameters in ECI parameter list window 618.

Figure 6C:
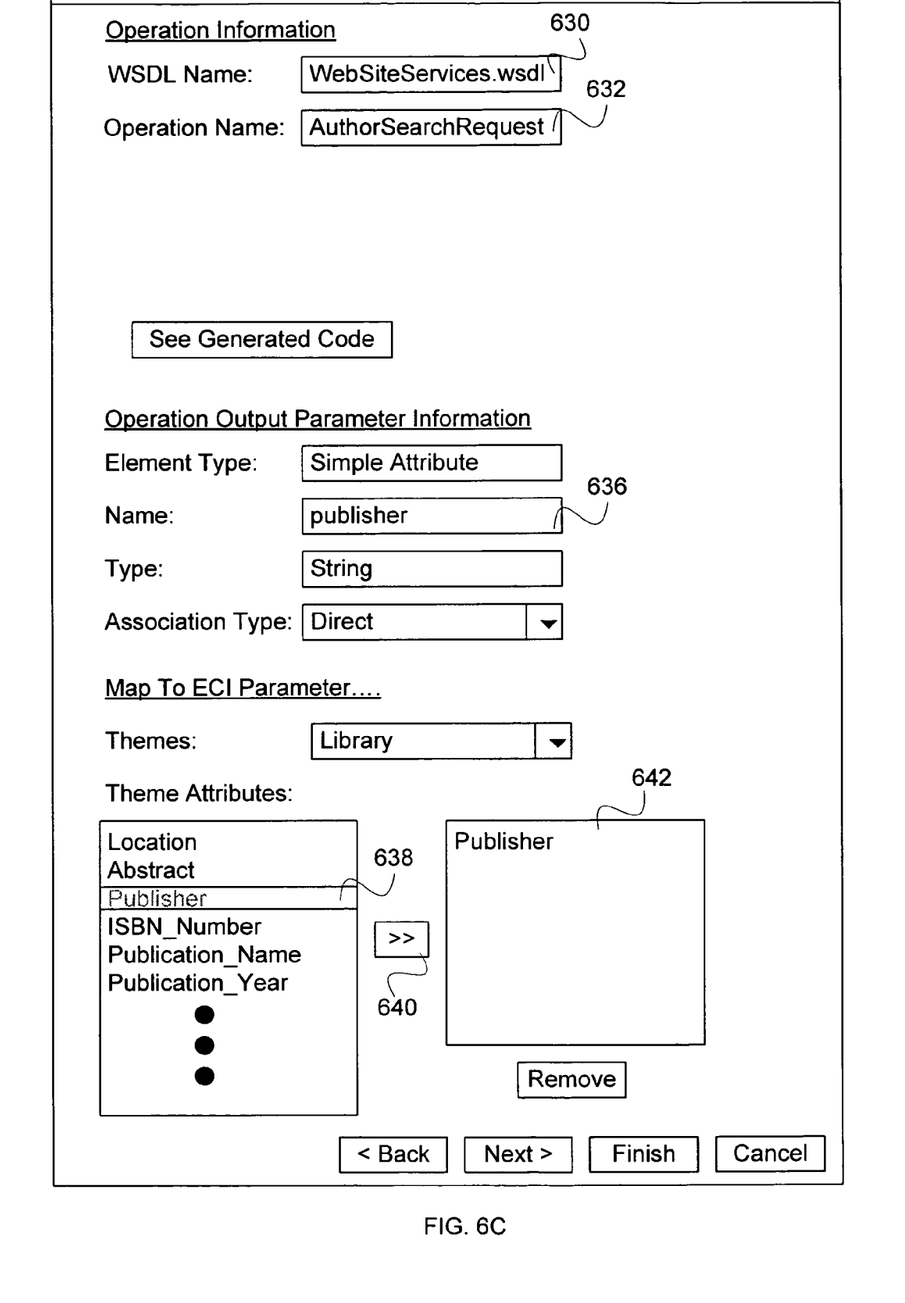
FIG. 6C is a block diagram illustrating an embodiment of a screen that is used for mapping an operation output search parameter to an ECI parameter.

FIG. 6C is a block diagram illustrating an embodiment of a screen that is used for mapping an operation output search parameter to an ECI parameter. In some embodiments, the screen in FIG. 6C is used for 508 of FIG. 5. In the example shown, the screen shot includes an indication of the WSDL file for the web service in WSDL file window 630, operation name window 632, name of operation output parameter window 636, ECI parameter list window 638, button 640 to move selected ECI parameter, and selected ECI parameter window 642. In some embodiments, output parameter information includes preferred content format or language, element type, type of parameter (e.g., string), and association type (e.g., direct). In some embodiments, ECI parameters groups, or themes, are selected using a pull down menu, which presents the user with a list of ECI parameters in ECI parameter list window 638.

Figure 6D:
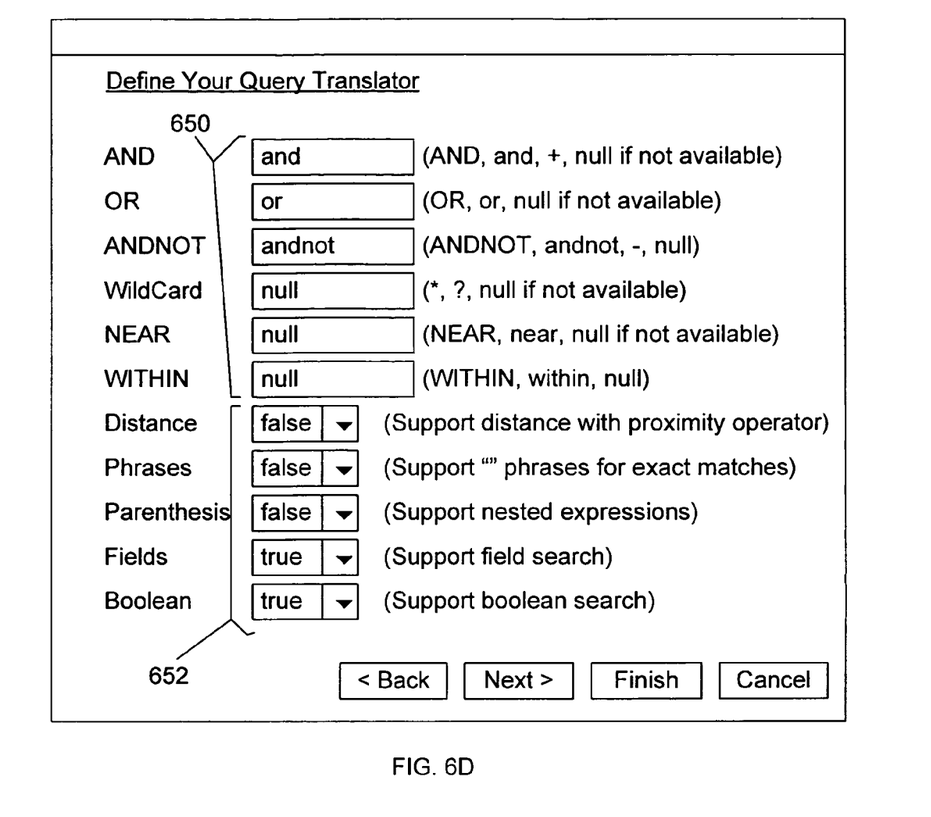
FIG. 6D is a block diagram illustrating an embodiment of a screen that is used for defining a query translator.

FIG. 6D is a block diagram illustrating an embodiment of a screen that is used for defining a query translator. In some embodiments, the screen in FIG. 6D is used for 510 of FIG. 5. In the example shown, translations for operation specific parameters are input. Windows 650 includes text entry windows for the translation of query string operations AND, OR, ANDNOT, WildCard, NEAR, and WITHIN. Pull down select boxes 652 include True/False selectors for indicating support for query string operators for Distance, Phrases, Parenthesis, Fields, and Boolean.

Figure 6E:
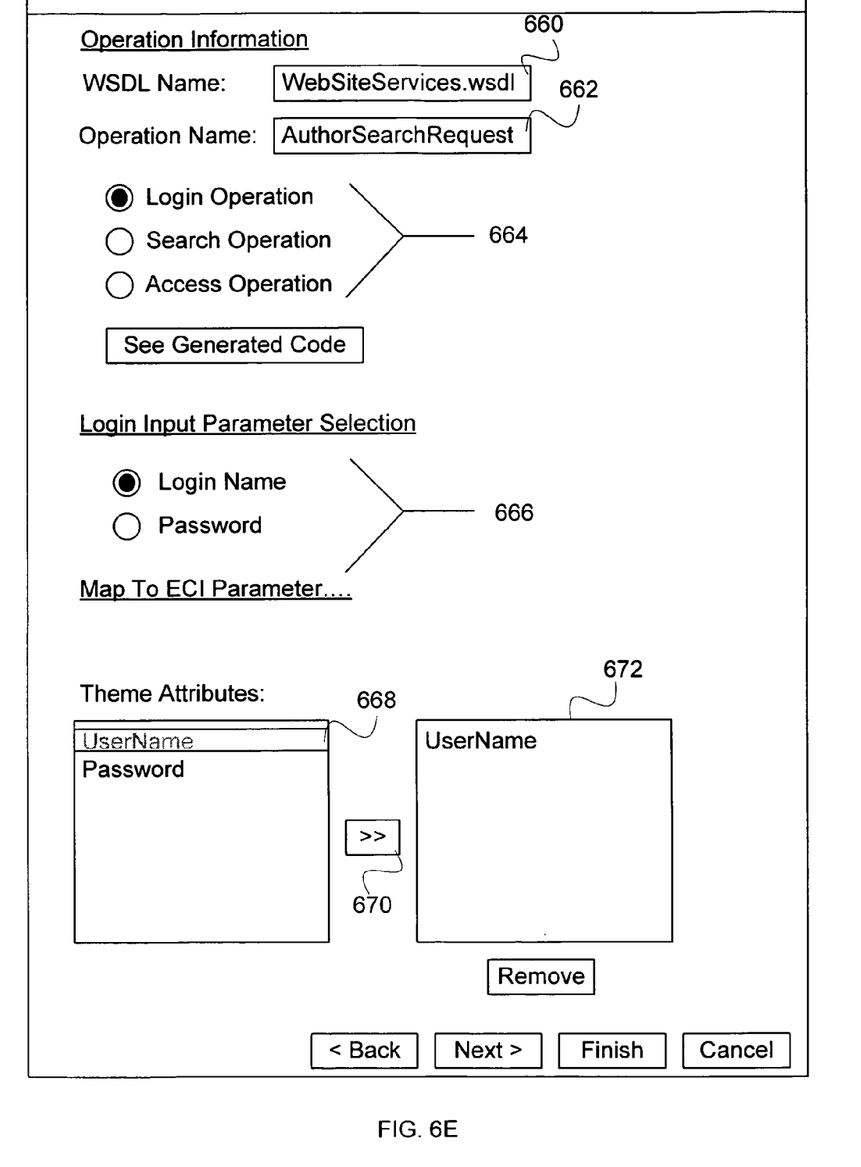
FIG. 6E is a block diagram illustrating an embodiment of a screen that is used for defining mapping an input login parameter to an ECI parameter.

FIG. 6E is a block diagram illustrating an embodiment of a screen that is used for defining mapping an input login parameter to an ECI parameter. In some embodiments, the screen in FIG. 6E is used for 506 of FIG. 5. In the example shown, the screen shot includes an indication of the WSDL file for the web service in WSDL file window 660, operation name window 662, radio buttons 664 to select the type of operation, radio buttons 666 to select which login input parameter ECI parameter list window 668, button 670 to move selected ECI parameter, and selected ECI parameter window 672. In some embodiments, login input parameter includes UserName and Password. In some embodiments, authentication method is specified or selected.

In some embodiments, the access operation has no parameters to map. In some embodiments, the developer can specify a configuration parameter indicating preferred content format or language for the adapter as an input for a content access operation.

Figure 7:
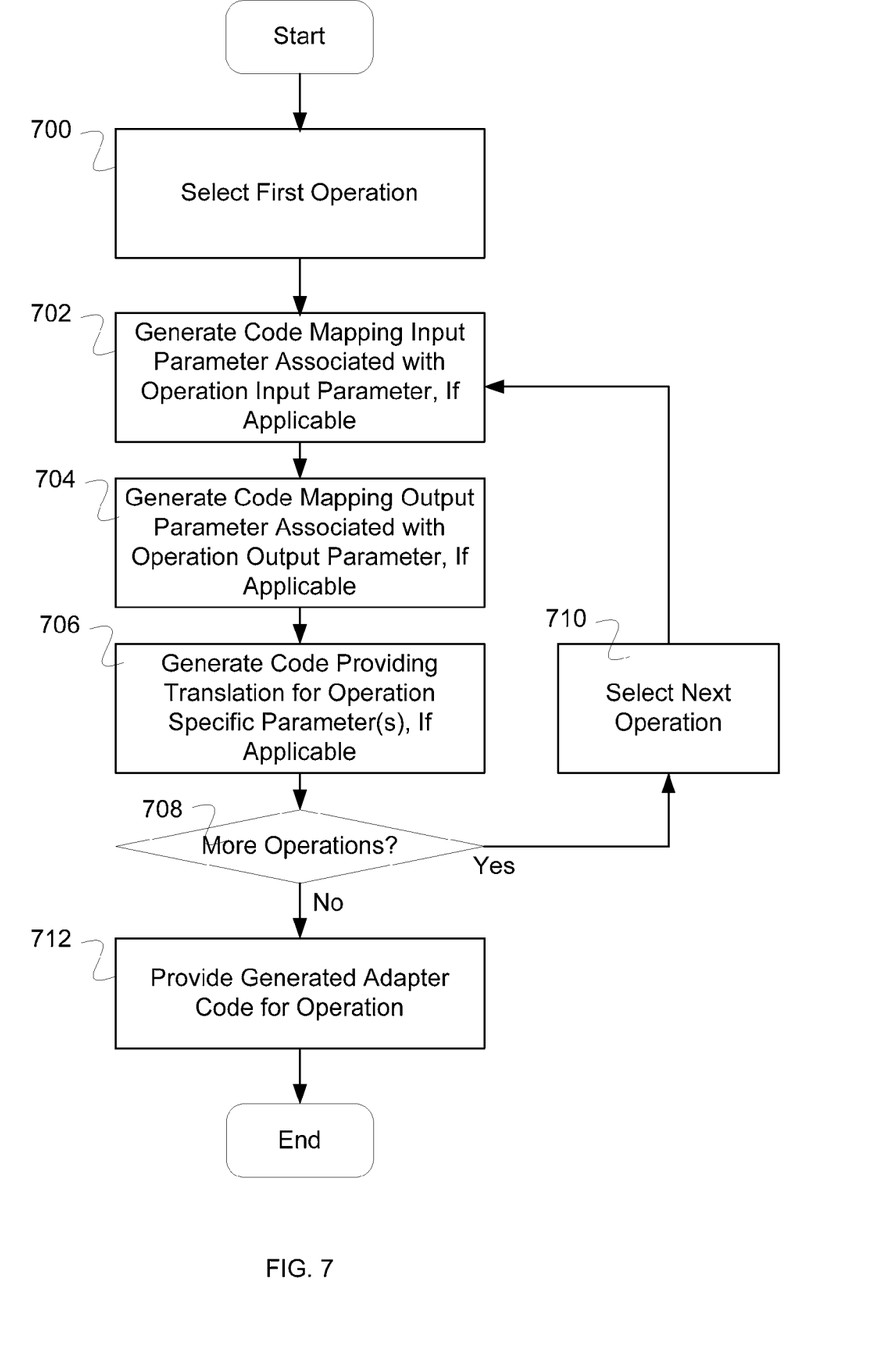
FIG. 7 is a flow diagram illustrating an embodiment of a process for generating adapter code.

FIG. 7 is a flow diagram illustrating an embodiment of a process for generating adapter code. In some embodiments, the process of FIG. 7 is used to implement 404 of FIG. 4. In the example shown, in 700 a first operation is selected (e.g., login). In 702, code is generated mapping an input parameter associated with an operation input parameter, if applicable. In 704, code is generated mapping an output parameter associated with an operation output parameter, if applicable. In 706, code is generated for operation specific parameter(s), if applicable. For example, a search syntax parameter that enables the web service adapter to translate a complex search query to a complex search query for the search desired using the web service. In 708, it is determined if there are more operations (e.g., search, access). If there are more operations, then in 710 a next operation is selected and control passes to 702. If there are not more operations, then in 712, the generated adapter code is provided. In some embodiments, the adapter code is displayed for the developer that is executing the wizard to develop the web service adapter.

Figure 8:
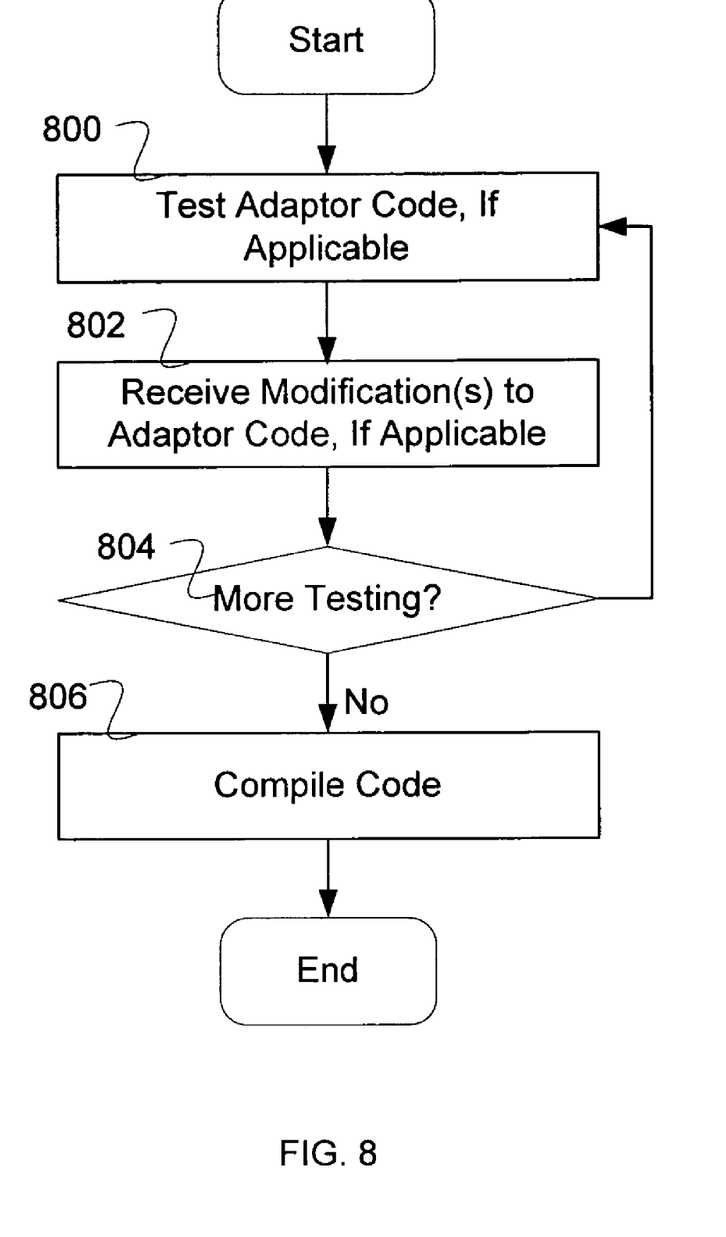
FIG. 8 is a flow diagram illustrating an embodiment of a process for testing and compiling the adapter code.

FIG. 8 is a flow diagram illustrating an embodiment of a process for testing and compiling the adapter code. In some embodiments, the process of FIG. 8 is used to implement 406 of FIG. 4. In 800, adapter code is tested, if applicable. A developer may want to skip to 802 and modify the code before testing. It may be obvious to the developer that the code will not perform as desired. In 802, the adapter code is modified, if applicable. If the testing went without error and had the expected outcome, then no modifications to the code may be necessary or desired. In 804, it is determined if there is more testing desired. A user may be prompted with a button box to indicate if more testing is desired or not. If there is more testing desired, then control passes to 800. If no more testing is desired, then control passes to 806. In 806, the code is compiled and the process ends.

In various embodiments, the generated web service adapter code enables access to content at a URL identified by a search result or logging into a web service enabling using a web service as an information source during a search, where the search calls on and uses a web service adapter to provide said capability. In some embodiments, the same adapter that is generated by the wizard is used for access such that the access operation is automated, so that the adapter code enables access to content through an adapter generated 'access' method.

Figure 9:
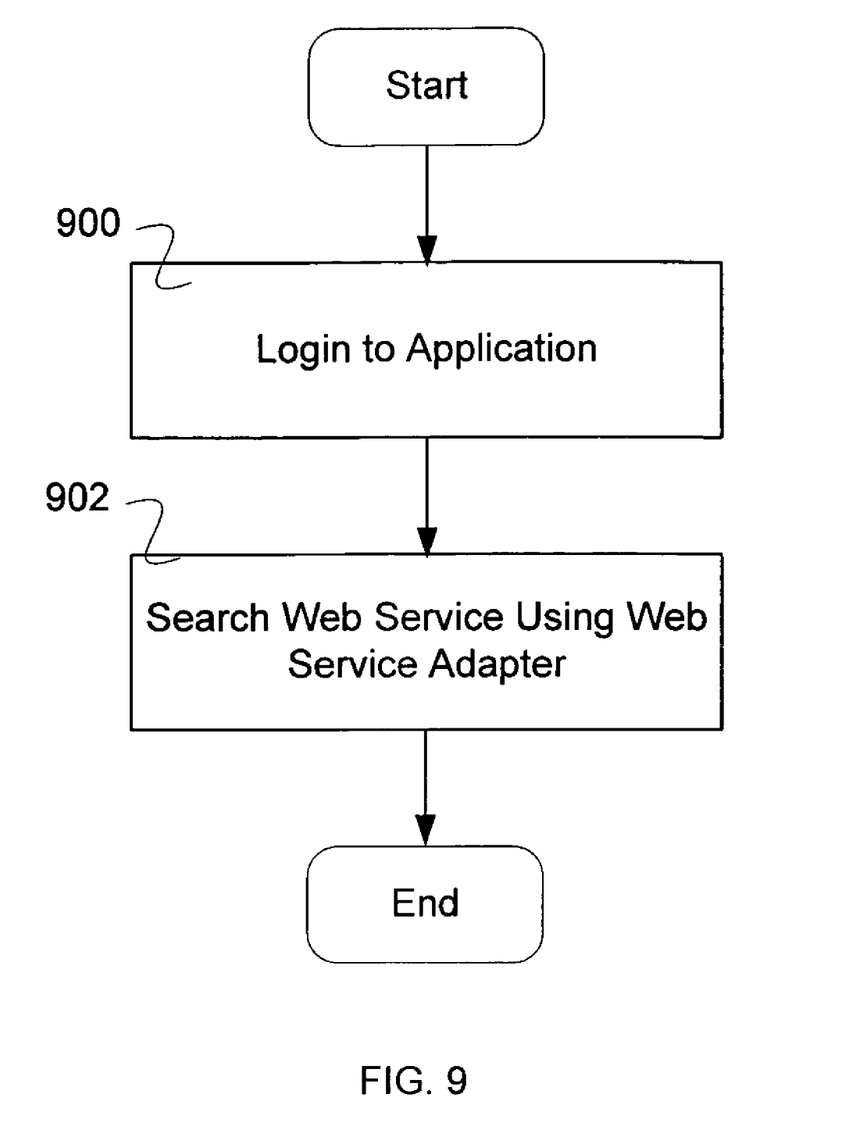
FIG. 9 is a flow diagram illustrating an embodiment of a process for searching using a web service adapter.

FIG. 9 is a flow diagram illustrating an embodiment of a process for searching using a web service adapter. In some embodiments, the process of FIG. 9 is used when executing a search command that uses a web service adapter such as web service adapter 112, 116, and/or 120 of FIG. 1, which may have been created with a web service adapter wizard. In the example shown, in 900 a user logs into an application. The application is run on a content management server such as content management server 102 of FIG. 1. In 902, a web service is searched using a web service adapter. A user requests a search, which utilizes a web service adapter to retrieve information from a web site associated with a web service.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for generating a search web services adapter comprising:
receiving an indication associated with a web service for which the search web services adapter is to be generated, wherein the indication associated with a web service is received at a content management system, wherein the search web services adapter is to be generated at the content management system and to be deployed at an external search server that is configured to perform searches at the web service on behalf of a user search application at the content management system including by being configured to use the search web services adapter to execute a user search request received at the user search application at the content management system and to submit a response to the user search request to the user search application, wherein the external search server is separate from a server associated with the web service;
receiving an indication that an input parameter associated with an operation associated with the web service corresponds to a search query parameter;
receiving an indication that an output parameter associated with the operation corresponds to a search result parameter;
receiving an indication associated with whether a syntax symbol associated with the operation is available or is not available at the user search application at the content management system;
receiving an indication that a mapping of parameters for the operation is complete; and
generating automatically, in response to reception of the indication that the mapping of parameters for the operation is complete, adapter code configured to translate a query into a form required by the web service to perform the operation, including by:
mapping a received input value for the search query parameter to the input parameter,
mapping a received output value for the output parameter to the search result parameter, and
mapping a received input value associated with the syntax symbol that is indicated as being available at the user search application to a corresponding syntax parameter.

2. A method as in claim 1, wherein the indication associating the input or output parameter with the search query or search results parameter comprises indicating using a graphical user interface.

3. A method as in claim 1, further comprising receiving a selection of the web service.

4. A method as in claim 1, further comprising identifying one or more operations available for the web service.

5. A method as in claim 4, wherein operations are identified using a web service contract file.

6. A method as in claim 4, wherein operations are displayed for a user.

7. A method as in claim 1, further comprising receiving a selection of an operation available for the web service.

8. A method as in claim 1, further comprising receiving login information enabling utilization of the web service.

9. A method as in claim 1, wherein the generated adapter code is displayed.

10. A method as in claim 1, wherein the generated adapter code is allowed to be modified by a user.

11. A method as in claim 1, wherein the adapter code is tested.

12. A method as in claim 1, wherein the adapter code is compiled.

13. A method as in claim 12, further comprising deploying compiled adapter code to the external search server.

14. A method as in claim 1, wherein the adapter code enables access to content at a URL identified by a search result.

15. A method as in claim 1, wherein the adapter code enables access to content through an adapter generated 'access' method.

16. A method as in claim 1, further comprising generating automatically adapter code configured to login to the web service.

17. A method as in claim 1, further comprising generating automatically adapter code configured to access content resulting from a web service search operation.

18. A computer program product for generating a search web services adapter, the computer program product being embodied in a non-transitory computer readable medium and comprising computer instructions for:
receiving an indication associated with a web service for which the search web services adapter is to be generated, wherein the indication associated with a web service is received at a content management system, wherein the search web services adapter is to be generated at the content management system and to be deployed at an external search server that is configured to perform searches at the web service on behalf of a user search application at the content management system including by being configured to use the search web services adapter to execute a user search request received at the user search application at the content management system and to submit a response to the user search request to the user search application, wherein the external search server is separate from a server associated with the web service;
receiving an indication that an input parameter associated with an operation associated with the web service corresponds to a search query parameter;
receiving an indication that an output parameter associated with the operation corresponds to a search result parameter;
receiving an indication associated with whether a syntax symbol associated with the operation is available or is not available at the user search application at the content management system;
receiving an indication that a mapping of parameters for the operation is complete; and
generating automatically, in response to reception of the indication that the mapping of parameters for the operation is complete, adapter code configured to translate a query into a form required by the web service to perform the operation, including by:
mapping a received input value for the search query parameter to the input parameter,
mapping a received output value for the output parameter to the search result parameter, and
mapping a received input value associated with the syntax symbol that is indicated as being available at the user search application to a corresponding syntax parameter.

19. A system for generating a search web services adapter comprising:
a processor; and
a memory coupled with the processor, wherein the memory is configured to provide the processor with instructions which when executed cause the processor to:

receive an indication associated with a web service for which the search web services adapter is to be generated, wherein the indication associated with a web service is received at a content management system, wherein the search web services adapter is to be generated at the content management system and to be deployed at an external search server that is configured to perform searches at the web service on behalf of a user search application at the content management system including by being configured to use the search web services adapter to execute a user search request received at the user search application at the content management system and to submit a response to the user search request to the user search application, wherein the external search server is separate from a server associated with the web service;

receive an indication that an input parameter associated with an operation associated with the web service corresponds to a search query parameter;

receive an indication that an output parameter associated with the operation corresponds to a search result parameter;

receive an indication associated with whether a syntax symbol associated with the operation is available or is not available at the user search application at the content management system;

receive an indication that a mapping of parameters for the operation is complete; and generate automatically, in response to reception of the indication that the mapping of parameters for the operation is complete, adapter code configured to translate a query into a form required by the web service to perform the operation, including by;

mapping a received input value for the search query parameter to the input parameter;

mapping a received output value for the output parameter to the search result parameter, and     mapping a received input value associated with the syntax symbol that is indicated as being available at the user search application to a corresponding syntax parameter.

20. A system as in claim 19, wherein the indication associating the input or output parameter with the search query or search results parameter comprises the processor configured to indicate using a graphical user interface.

21. A system as in claim 19, wherein the processor is further configured to identify one or more operations available for the web service.

22. A system as in claim 21, wherein operations are identified using a web service contract file.

23. A system as in claim 19, wherein the processor is further configured to receive a selection of an operation available for the web service.

24. A system as in claim 19, wherein the processor is further configured to receive login information enabling utilization of the web service.

\* \* \* \* \*